(12) United States Patent
Goodrich

(10) Patent No.: US 9,677,701 B2
(45) Date of Patent: Jun. 13, 2017

(54) ADAPTABLE EQUIPMENT MOUNTING SYSTEM FOR A VEHICLE

(71) Applicant: Robert Goodrich, Boardman, OH (US)

(72) Inventor: Robert Goodrich, Boardman, OH (US)

(*) Notice: Subject to any disclaimer, the term of this patent is extended or adjusted under 35 U.S.C. 154(b) by 0 days.

(21) Appl. No.: 15/005,158

(22) Filed: Jan. 25, 2016

(65) Prior Publication Data
US 2016/0221512 A1    Aug. 4, 2016

Related U.S. Application Data

(60) Provisional application No. 62/109,125, filed on Jan. 29, 2015.

(51) Int. Cl.
*B60R 11/00* (2006.01)
*F16M 1/00* (2006.01)
*F16M 13/02* (2006.01)

(52) U.S. Cl.
CPC ............ *F16M 1/00* (2013.01); *B60R 11/00* (2013.01); *F16M 13/02* (2013.01); *B60R 2011/0029* (2013.01); *B60R 2011/0052* (2013.01)

(58) Field of Classification Search
CPC ............ B60R 2011/0066; B60R 11/00; B60R 2011/0029; B60R 2011/0052; F16M 1/00; F16M 13/02
USPC ................ 224/403, 404, 539, 42.37, 42.32; 248/316.8, 346.03
See application file for complete search history.

(56) References Cited

U.S. PATENT DOCUMENTS

| | | | | |
|---|---|---|---|---|
| 1,639,606 A | * | 8/1927 | Hays | B60R 9/02 224/42.32 |
| 3,493,201 A | * | 2/1970 | Marran | F16M 7/00 248/346.03 |
| 3,685,708 A | * | 8/1972 | Herrington | B60R 11/02 224/483 |
| 4,934,720 A | * | 6/1990 | Dobron | B62B 5/0083 108/56.1 |
| 5,497,708 A | * | 3/1996 | Jeruzal | B65D 19/44 108/54.1 |
| 5,730,414 A | * | 3/1998 | Wenger | B62D 25/2072 224/42.32 |
| 6,340,105 B1 | * | 1/2002 | Black | B60R 9/00 211/85.18 |
| 6,511,272 B2 | * | 1/2003 | Stafford | B60P 7/15 410/121 |
| 7,350,835 B1 | | 4/2008 | Smith | |
| 7,503,571 B2 | * | 3/2009 | Cromie | B62B 3/10 280/32.6 |
| 8,544,794 B2 | | 10/2013 | Ciprian | |
| 2006/0237502 A1 | * | 10/2006 | Tweet | B62D 31/003 224/401 |

(Continued)

*Primary Examiner* — Corey Skurdal
(74) *Attorney, Agent, or Firm* — Harpman & Harpman

(57) ABSTRACT

An adaptable equipment mounting platform in a vehicle application wherein a fixed equipment configuration is to be secured therein to provide a mobile use configuration. A universal mounting frame having multiple fixed vehicle mounting points that conform to the vehicle's required safe drill access areas provides correspondingly adjustable equipment attachment fasteners. The mounting frame therefore allows for a variety of different equipment configurations to be installed in a commercial vehicle that heretofore were unavailable due to their structural design that limited the areas in which safe mounting could occur.

4 Claims, 3 Drawing Sheets

(56) References Cited

U.S. PATENT DOCUMENTS

2008/0066657 A1* 3/2008 Kuo .................. B65D 19/0095
108/57.19

* cited by examiner

ADAPTABLE EQUIPMENT MOUNTING SYSTEM FOR A VEHICLE

This application claims the benefit of U.S. Provisional Application No. 62/109,125, filed Jan. 29, 2015.

BACKGROUND OF THE INVENTION

1. Technical Field

This invention relates to the installation of equipment in commercial transport (van) type vehicles to provide their mobile on site use. Such typical applications are that of commercial steam cleaning equipment extensively used in the carpet cleaning and related industries.

2. Description of Prior Art

Prior art devices of this type are not specifically known, however, floor mounting systems can be seen in U.S. Pat. Nos. 7,350,835 and 8,544,794 which are directed to floor channels used in seat and cargo venues such as aircraft.

U.S. Pat. No. 7,681,280 discloses a three-point mount for industrial carpet cleaning equipment having a rigid platform with fixed equipment attachment and structural points.

SUMMARY OF THE INVENTION

A platform mounting system for use in commercial van type vehicles that provides adjustable mounting attachment points for commercial cleaning equipment and the like. The platform has multiple channel frames with movable equipment engagement fasteners that are adapted for precise positioning and attachment to the equipment. Fixed multiple platform frame mounting plates correspond to the vehicle's floor safe attachment positions assuring a safe and stable mounting system for commercial van having limited mounting surfaces that heretofore would make such equipment mounting difficult and require a custom mount presumably for each application.

DETAILED DESCRIPTION OF THE INVENTION

Figure 1:
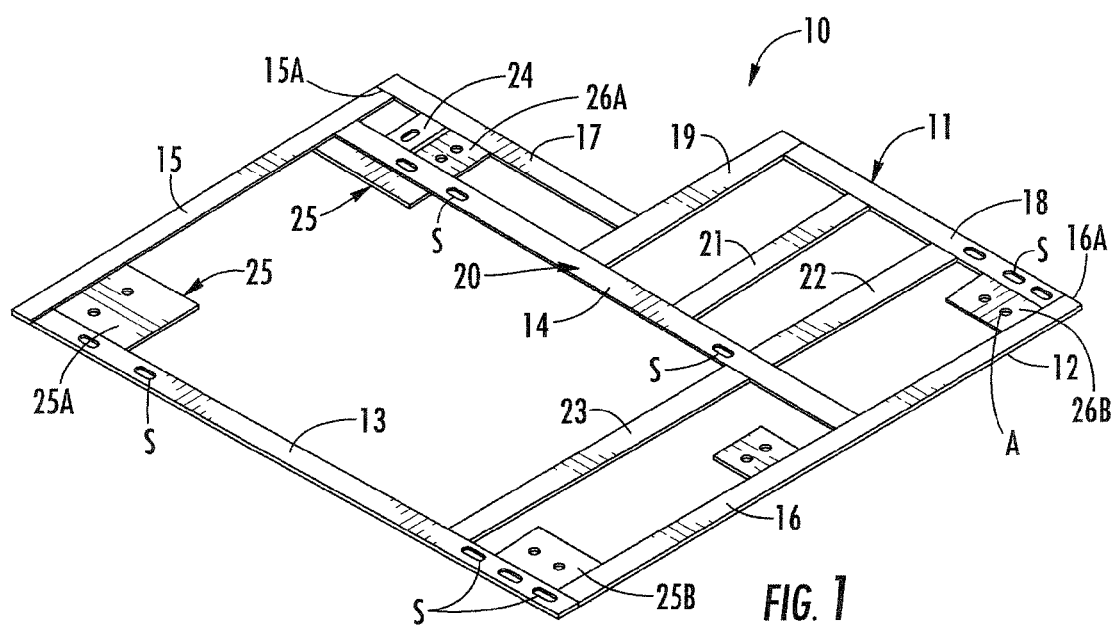
FIG. 1 is a perspective view of the mounting system of the invention.

Referring now to FIG. 1 of the drawings, a mobile mounting system 10 of the invention for cleaning equipment can be seen having a main frame support platform 11. The support platform is comprised of a plurality of inverted U-shaped channel members 12 which are secured together preferably by welding to form an integral construction platform. A first pair of spaced parallel channel members 13 and 14 are interconnected by their oppositely disposed free ends by respective end channel members 15 and 16 extending there beyond.

A second pair of spaced channel members 17 and 18 extend at right angles from the end members 15 and 16 respective free ends 15A and 16A with a transverse interconnecting channel member 19 extending at right angles from the free end of the hereinbefore described channel member 18 to a midway point at 20 of the corresponding channel member 14 thereby completing an outside perimeter configuration of the equipment support platform of the invention.

Figure 2:
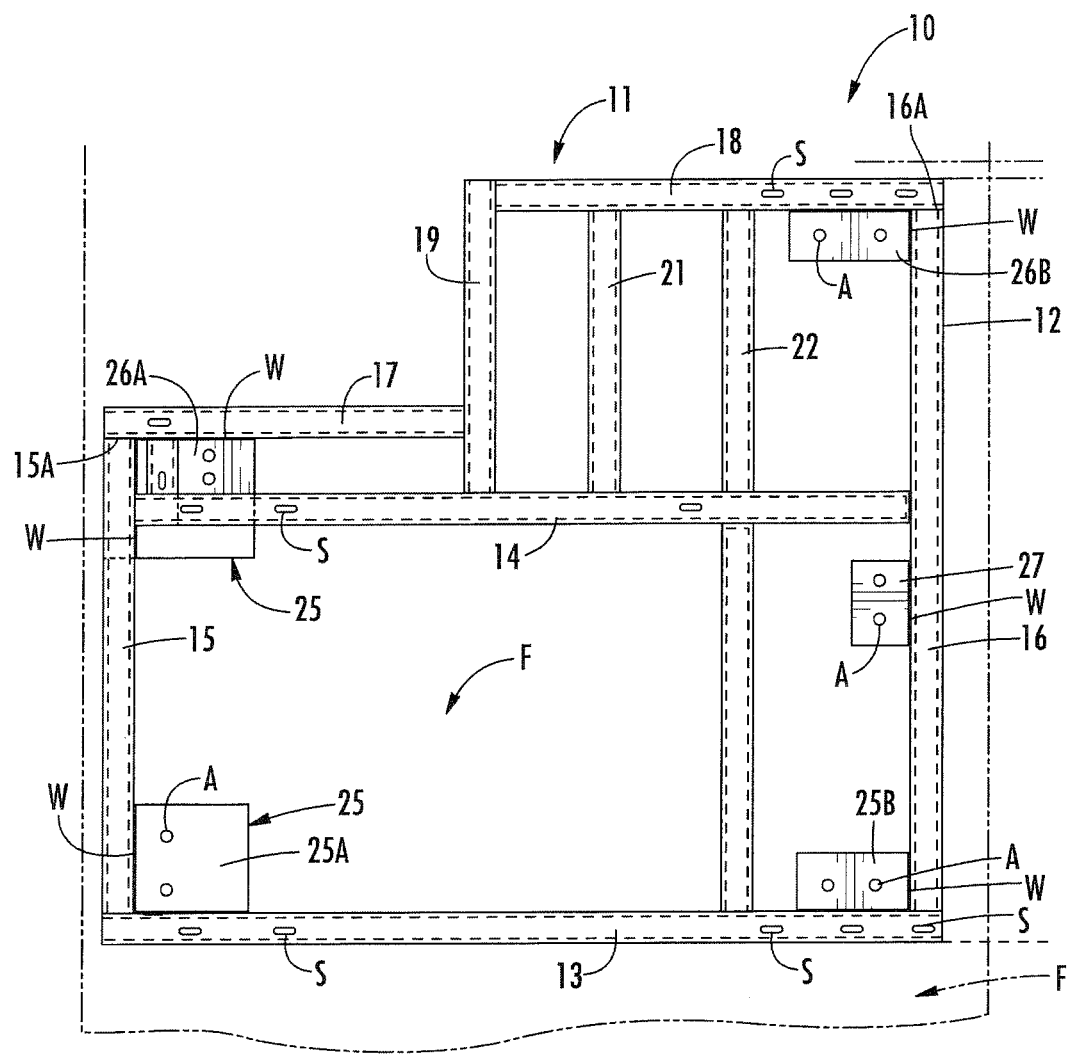
FIG. 2 is a top plan view thereof.

A pair of interiorly positioned channel members 21 and 22 extended in spaced parallel relation to one another between the hereinbefore described channel members 14 and 18 in spaced relation to the corresponding respective perimeter channels 16 and 19 as best seen in FIG. 2 of the drawings. A second interior channel member 23 extends between and is secured to corresponding channel members 14 and 13 in longitudinal alignment with the hereinbefore described channel member 22. A final interior channel member 24 extends between the parallel channel member's 17 and 14 adjacent the intersection of the corresponding channel member 15 completing the basic channel member platform frame illustrated in the preferred embodiment.

In this example chosen for illustration, a plurality of aperture platform attachment plates 25 are secured to respective channel members at their corresponding right angle corners of the perimeter platform frame indicated as attachment plates 25A, 25B, 26A and 26B. Each of the platform attachment plates 25 are secured by welding with multiple apertures A therein to provide for corresponding multiple safe drill attachment points from the floor F of the vehicle, shown in broken lines in FIG. 2 of the drawings, in this application.

An additional platform attachment plate 27 is positioned on the inside surface of the channel member 16 between the respective channel members 13 and 14 in spaced relation to the corner platform attachment plate 26B completing the desired configuration, as noted.

As noted, and as will be evident to those skilled in the art familiar with the requirements of specific vehicle configurations, the hereinbefore described multiple designated platform attachment plates correspond precisely with the vehicle's defined safe drill and attachment points which are limited in given classes of vehicle to these areas.

Figure 3:
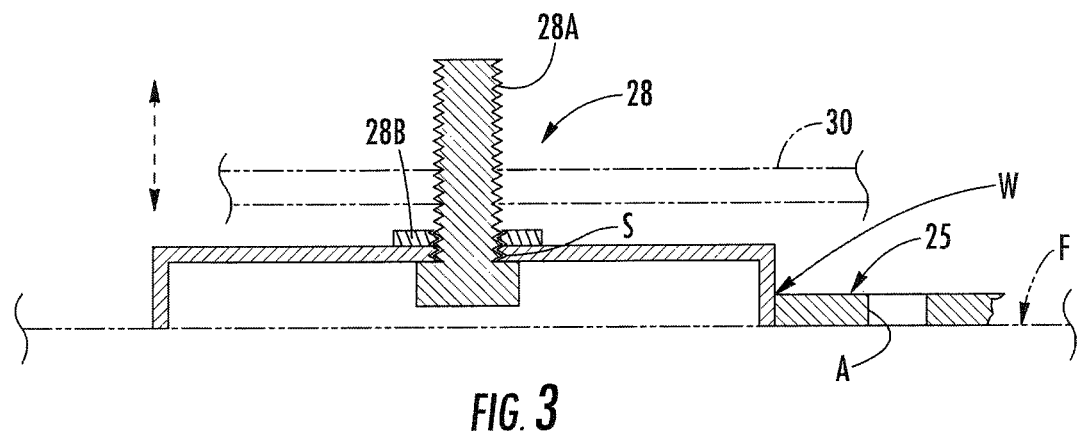
FIG. 3 is an enlarged partial cross sectional view on lines 3-3 of FIG. 2.
Figure 4:
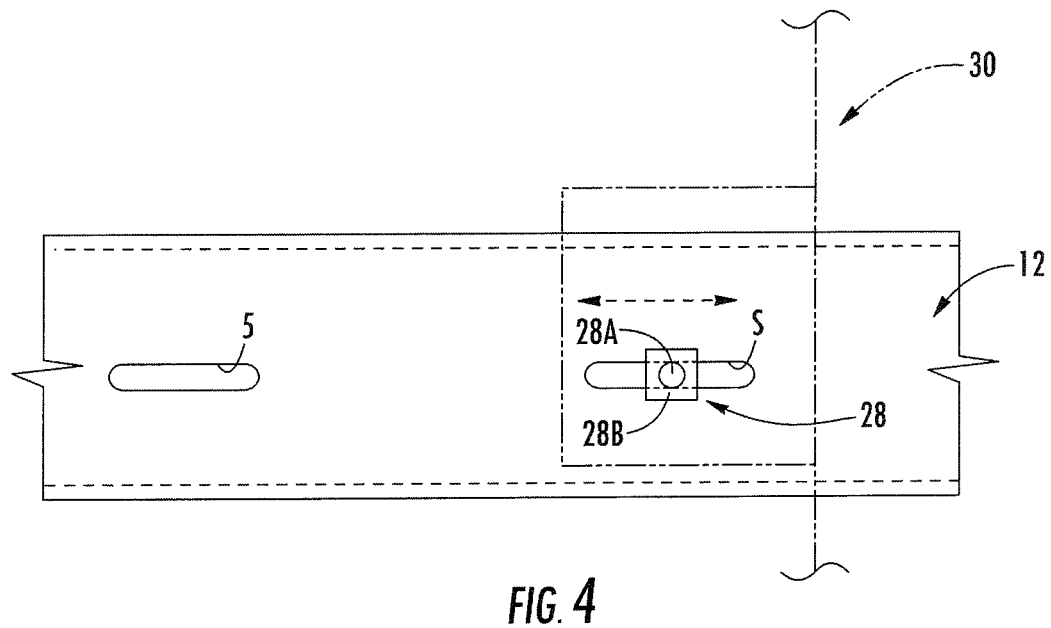
FIG. 4 is an enlarged partial cross sectional view of the individual adjustment equipment mounting fasteners of the mounting system.

Referring now to FIGS. 2, 3, 4 and 5 of the drawings, adjustable equipment mounting assemblies can be seen having a plurality of elongated slots S transversely centered in longitudinal alignment within the respective upper surfaces of the channel members 12. In this example, the multiple slots S are formed in the corresponding parallel channels 13, 14, 17 and 18 and the intermediate right angularly disposed channels 21 and 22. The slots S so designated for specific equipment to be mounted thereon have an adjustable fixation fastener assembly 28 there within as best seen in FIGS. 3 and 4 of the drawings. Each of the fixation fastener assemblies 28 has an equipment engagement bolt 28A slidably disposed within its respective slot S for adjustable alignment with the equipment as will be described in greater detail hereinafter. Each of the equipment engagement bolts 28A have a bolt retainment thread washer 28B extending there over so as to retain the engagement bolts 28A in movable position within the respective slots S prior to equipment mounting.

It will be seen that the engagement bolt 28A can therefore be adjusted within the slot parameter to match exactly the mounting opening in the equipment 30 showing graphically by broken lines in FIGS. 3 and 4 of the drawings thereby adjusting the engagement bolt 28A to match the equipment prior to installation.

This precise adjustment is achieved outside the vehicle, as noted, before the installation by elevating the equipment 30 by conventional means and then fitting the mounting frame of the invention with its multiple equipment engagement bolts 28A thereto. Each of the equipment engagement bolts 28A are adjusted within their respective slots so as to register exactly with the equipment engagement points. Once this exact alignment has been determined, the frame is then removed and mounted within the vehicle van by attaching multiple fasteners through its correspondingly aperture attachment plates 25 that define the safety drill zone as noted through the vehicle's floor. This allows for mounting of equipment heretofore impossible without a custom mounting frame for each equipment configuration dictated by the van's safety drilling zones as noted.

Once the frame has been attached by conventional fasteners as noted, the equipment 30 can then be lifted into the van and set precisely onto the now pre-adjusted mounting frame attachment bolts of the invention achieving a true custom fit for the equipment.

It will be evident that due to the adaptable nature of the frame support platform 11 of the invention with its multiple equipment engagement bolt assemblies 28A and bolt slots S which can be modified to accommodate a variety of different equipment configurations that may be found in such applications as cleaning equipment a true universal mounting system has been illustrated and described that will allow the use of vehicle's that heretofore are currently unusable due to their extremely limited attachment points and would require, in essence, a custom frame for each application situation. Such a configuration defines a unique and novel adaptable equipment mounting system for a variety of equipment configurations specifically within the cleaning industry.

It will thus be seen that a new and novel universal adaptable equipment mounting system for motor vehicles has been illustrated and described and it will be apparent to those skilled in the art that various changes and modifications may be made thereto without departing from the spirit of the invention.

The invention claimed is:

1. An equipment mounting platform for vehicles comprising,
    pairs of spaced parallel elongated channel members said respective pairs secured at right angles to one another,
    aperture attachment plates secured to said channel members at their respective intersections in horizontal planar alignment therewith,
    said channel members in horizontal planar alignment with one another,
    a second pair of offset parallel aligned and spaced channel member extend at right angles from respective free ends of one said parallel elongated channel members in horizontal planar alignment with therewith,
    a transverse interconnecting channel member extending between and secured to the free ends of said second pair of offset parallel aligned and spaced channel members defining one outside perimeter edge of said equipment mounting platform,
    a plurality of interiorly positioned channel members extending between one of said respective second pair of offset parallel aligned spaced channel members and pairs of channel members,
    a plurality of adjustable equipment mounting assemblies in said respective channel members.

2. The equipment mounting platform for vehicles set forth in claim 1 wherein said adjustable equipment mounting assemblies comprises,
    longitudinally aligned slots in said respective channel members and platform mounting apertures in said attachment plates,
    upstanding threaded fasteners slidably retained within said slots and threaded retainment washers on said fasteners and threaded retainment washers on said fasteners.

3. The equipment mounting platform for vehicles set forth in claim 1 wherein said apertured attachment plates are secured to said channel member intersections by welding.

4. The equipment mounting platform for vehicles set forth in claim 1 where one of said interior positioned channel members extends between one of said pairs of spaced parallel channel members.

* * * * *